United States Patent
Michiyama

(10) Patent No.: US 7,692,535 B2
(45) Date of Patent: Apr. 6, 2010

(54) LIGHTING CONTROL SYSTEM FOR CONTROL DEPENDENT ON WEATHER CONDITION

(75) Inventor: Katsunori Michiyama, Toyota (JP)

(73) Assignee: DENSO CORPORATION, Kariya (JP)

(*) Notice: Subject to any disclaimer, the term of this patent is extended or adjusted under 35 U.S.C. 154(b) by 389 days.

(21) Appl. No.: 11/730,604

(22) Filed: Apr. 3, 2007

(65) Prior Publication Data

US 2007/0242470 A1 Oct. 18, 2007

(30) Foreign Application Priority Data

Apr. 10, 2006 (JP) ............................. 2006-107881

(51) Int. Cl.
*B60Q 1/26* (2006.01)

(52) U.S. Cl. ................. 340/469; 340/905; 340/539.22; 340/601

(58) Field of Classification Search ................. 340/469, 340/449, 441, 435, 905, 949, 955, 539.22, 340/539.26, 539.28, 539.27, 601, 602

See application file for complete search history.

(56) References Cited

U.S. PATENT DOCUMENTS

| | | | | |
|---|---|---|---|---|
| 3,901,812 A | * | 8/1975 | Hallengren | ................. 250/565 |
| 5,374,852 A | * | 12/1994 | Parkes | ....................... 307/10.8 |
| 6,049,749 A | * | 4/2000 | Kobayashi | .................... 701/49 |
| 6,254,259 B1 | * | 7/2001 | Kobayashi | ................... 362/465 |
| 6,406,172 B1 | * | 6/2002 | Harbers et al. | ............... 362/544 |
| 6,789,637 B1 | * | 9/2004 | Winner et al. | ................ 180/170 |
| 2003/0067786 A1 | * | 4/2003 | Begemann et al. | ........... 362/543 |
| 2007/0002571 A1 | * | 1/2007 | Cejnek et al. | ................ 362/460 |

FOREIGN PATENT DOCUMENTS

| | | |
|---|---|---|
| JP | H-6-43587 | 6/1994 |
| JP | A-7-186824 | 7/1995 |
| JP | A-11-278182 | 10/1999 |
| JP | A-2000-65932 | 3/2000 |
| JP | A-2001-351411 | 12/2001 |

* cited by examiner

*Primary Examiner*—Daniel Previl
(74) *Attorney, Agent, or Firm*—Posz Law Group, PLC

(57) ABSTRACT

A vehicle lighting control system is disclosed that includes a weather detecting device for detecting a weather condition and a degree thereof. The lighting control system also includes a control device for controlling the light emitting apparatus based on the weather condition and the degree of the weather condition.

18 Claims, 7 Drawing Sheets

OPTICAL AXIS=LO

OPTICAL AXIS=HI

| IRRADIATING<br>COLOR FOG<br>DENSITY D | R:100/G:100/B:100<br>WHITE<br>(i=1, C1=1.0) | R:100/G:100/B:50<br>THIN YELLOW<br>(i=2, C2=0.5) | R:100/G:100/B:25<br>THICK YELLOW<br>(i=3, C3=0.25) |
|---|---|---|---|
| NO FOG | T1:HI<br>V1:HI | T2:HI<br>V2:MED | T3:HI<br>V3:LO |
| THIN FOG | T1:MED<br>V1:MED | T2:HI<br>V2:HI | T3:HI<br>V3:MED |
| THICK FOG | T1:LO<br>V1:LO | T2:MED<br>V2:MED | T3:HI<br>V3:HI |

LIGHTING CONTROL SYSTEM FOR CONTROL DEPENDENT ON WEATHER CONDITION

CROSS REFERENCE TO RELATED APPLICATION

The following is based on and claims priority to Japanese Patent Application No. 2006-107881, filed Apr. 10, 2006, which is hereby incorporated by reference in its entirety.

FIELD

The following generally relates to a lighting control system and, more particularly, to a lighting control system for control that is dependent on a detected weather condition.

BACKGROUND

Several vehicle auxiliary lighting systems have been proposed. For instance, JP-7-186824A discloses a system provided with a bulb, a higher position irradiating outer lens and a lower position irradiating outer lens which output light, and a drive mirror. The drive mirror is positioned between the higher position irradiating outer lens and the bulb. When performing the higher position irradiation on a snowy road or the like, the drive mirror lowers and the light from the bulb is emitted from the higher position irradiating outer lens without being reflected by the drive mirror. On the other hand, when the lower position irradiation is performed in foggy conditions or the like, the drive mirror raises, and the light from the bulb is reflected by the drive mirror and emitted from the lower position irradiating outer lens.

In the device disclosed in JP-2001-351411A, a fixed shade and a movable shade are combined, and by moving the movable shade, a plurality of luminous intensity distribution patterns are generated. More specifically, when the movable shade is in a first position, a part of the light from a light source is blocked by an opening of the movable shade, and thus a luminous intensity distribution pattern for the foggy weather is irradiated. Alternatively, when the movable shade is in a second position, the luminous intensity distribution pattern for the foggy weather is irradiated.

Although conventional auxiliary lighting apparatuses disclosed in JP-7-186824A and JP-2001-351411A are capable of performing the luminous intensity distribution suitable to a case where there is the snow or the fog in the surroundings of a vehicle, they are incapable of turning on and controlling the luminous intensity distribution suitably in accordance with a degree (i.e., severity) of the weather condition. This can be problematic, for example, when the fog is thick, and a driver of a vehicle is distracted by the light irregularly reflected by the fog due to the optical axis of the light being excessively high. Similarly, when the fog is thin, the light is unable to reach a distant place on account of the optical axis being excessively low, which can impair the driver's vision of the road. Thus, the conventional auxiliary lighting apparatuses suffer from certain disadvantages that can detrimentally affect a driver's vision.

SUMMARY

A lighting control system is disclosed for controlling an irradiating range of a light emitting apparatus which is provided in a vehicle. The lighting control system includes a weather detecting device for detecting a weather condition surrounding the vehicle and a degree of the weather condition. The lighting control system also includes a control device for setting an irradiating range of the light emitting apparatus based on the weather condition and the degree of the weather condition.

A lighting control system is also disclosed for a vehicle. The lighting control system includes a light emitting apparatus and a weather detecting device for detecting a weather condition surrounding the vehicle and a degree of the weather condition. In addition, the lighting control system includes a control device for setting an irradiating range of the light emitting apparatus based on the weather condition and the degree of the weather condition.

Moreover, a lighting control system is disclosed for a vehicle. The lighting control system includes a light emitting apparatus and a weather detecting device for detecting a weather condition surrounding the vehicle and a degree of the weather condition. Additionally, the lighting control system includes a control device for setting an irradiating color of the light emitting apparatus based on the weather condition and the degree of the weather condition.

BRIEF DESCRIPTION OF THE DRAWINGS

Other objects, features, and advantages will become more apparent from the following detailed description made with reference to the accompanying drawings, in which like parts are designated by like reference numbers and in which.

DETAILED DESCRIPTION

First Embodiment

A first embodiment is described by use of FIGS. 1 to 5.

Figure 1:
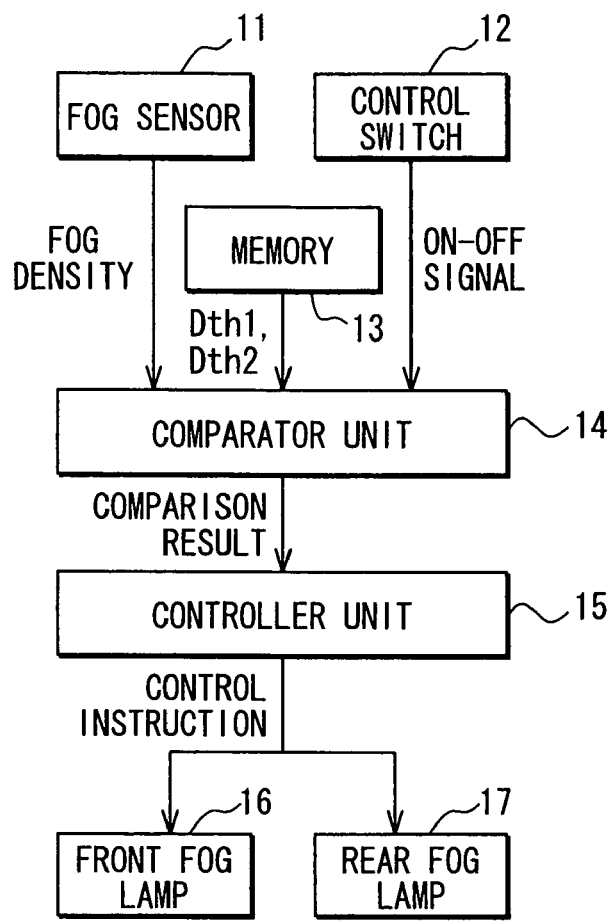
FIG. 1 is a block diagram of a lighting control system in a first embodiment.
Figure 2:
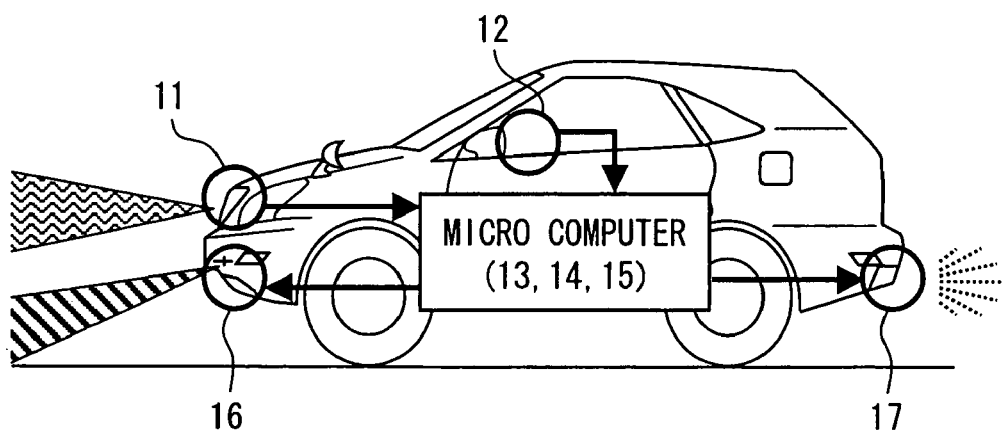
FIG. 2 is a schematic view of the lighting control system of the first embodiment.

FIG. 1 is a block diagram showing constitution of the present lighting control system, and FIG. 2 is an arrangement view showing a sensor and the like constituting the lighting control system in a vehicle.

The lighting control system is provided with a fog sensor 11 as a sensor for detecting a weather condition surrounding the vehicle. The fog sensor 11 is an optical radar mounted inside of a front grille of a vehicle as shown in FIG. 2 for detecting the degree of the fog (e.g., the density of the fog) surrounding the vehicle. The fog sensor 11 outputs a fog density signal indicative of the detected fog density. In one embodiment, the fog sensor 11 is a fog density measuring apparatus described in Japanese Utility Model Registration Application Publication No. Hei 6-43587 (hereby incorporated by reference), or the like.

The lighting control system is also provided with a control switch 12 which is a trigger in calculation processing described hereinafter by use of FIG. 3. The control switch 12 is suitably located adjacent the steering wheel of the vehicle, and the control switch 12 may be provided jointly, for example, with an operating switch of a headlamp, or the like. It should be noted that, the driver of the vehicle sets the control switch 12 to an ON position when the driver desires that the lighting control system automatically controls the optical axis and the irradiating range of the auxiliary lighting in accordance with the fog density, and sets the control switch 12 to an OFF position when the driver does not desire the automatic control. In this way, the control switch 12 outputs a turn-on or turn-off signal.

Figure 3:
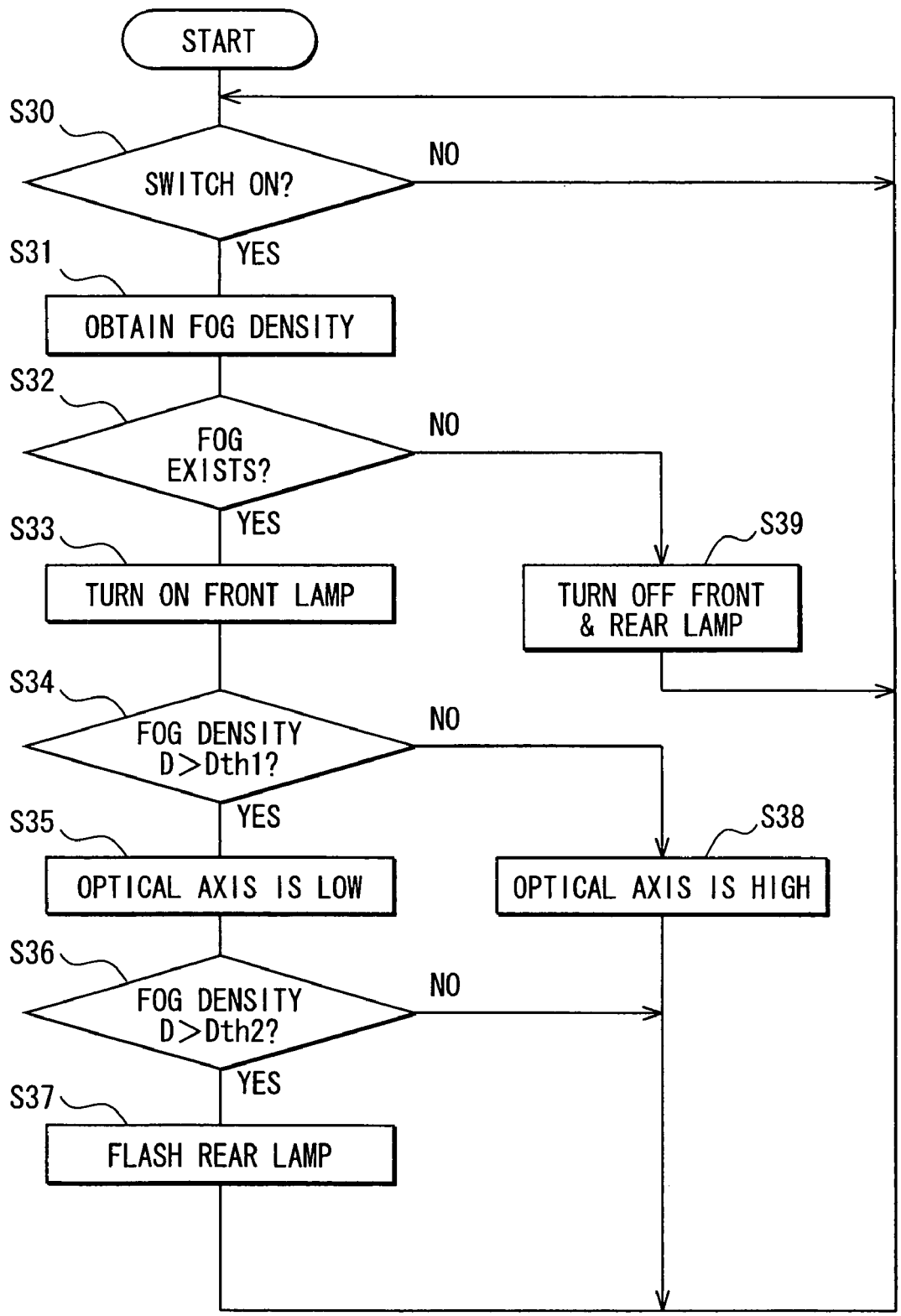
FIG. 3 is a flowchart showing internal processing of a comparator unit and a controller unit of the first embodiment.

Further, in a memory 13 in FIG. 1, a threshold which is described later by use of FIG. 3 is stored. The memory 13 is provided inside of a microcomputer in FIG. 2.

The turning-on or turning-off signals outputted from the control switch 12, the fog density signals outputted from the fog sensor 11, and the thresholds (Dth1, Dth2) stored in the memory 13 are inputted into a comparator unit 14 in FIG. 1. The comparator unit 14 performs a processing described later and illustrated in FIG. 3, and outputs a comparison result to a controller unit 15. The controller unit 15 determines a control instruction based on the comparison result inputted from the comparator unit 14, and outputs the control instruction to a front fog lamp 16 and a rear fog lamp 17. It should be noted that the comparator unit 14 and the controller unit 15 are programs and arranged on a microcomputer provided on a floor of the vehicle as shown in FIG. 2.

The front fog lamp 16 is a lighting apparatus provided at a front part of the vehicle as shown in FIG. 2. The front fog lamp 16 has a variable optical axis angle that is varied between two steps based on the control signal from the controller unit 15. The rear fog lamp 17 is provided at a rear part of the vehicle as shown in FIG. 2, and can perform flashing and turning off of the lamp based on the control instruction from the controller unit 15.

By use of a flowchart in FIG. 3, description is made of the calculation processing performed in the comparator unit 14 and the controller unit 15. The calculation processing is performed at predetermined times.

Beginning in step S30 a determination is made of whether the control switch 12 is turned on. If the control switch 12 is turned on, the step advances to step S31, and if it is not turned on, the step S30 is repeated. In other words, the processing in the step S31 and the subsequent processing are performed only when the control switch 2 is turned on.

In the step S31, the comparator unit 14 obtains a fog density D detected by the fog sensor 11. Next, in step S32, the comparator unit 14 performs a determination of whether or not there is fog surrounding the vehicle based on the fog density D detected in step S31. When it is determined that there is fog, step S33 follows, and when it is determined that there is no fog, step S39 follows.

In step S33, the controller unit 15 turns on the front fog lamp 16. On the other hand, in step S39, the controller unit 15 turns off the front fog lamp 16 and the rear fog lamp 17, and then the process returns to S30.

Figure 4A:
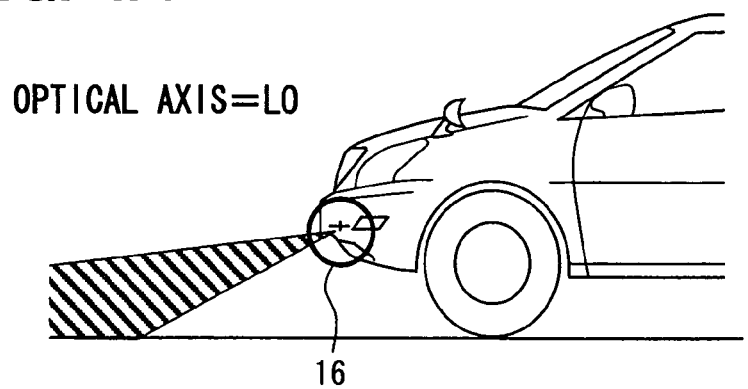
FIG. 4A is a diagram showing the irradiating range when an optical axis of a front fog lamp is lowered (Lo) in the first embodiment.
Figure 4B:
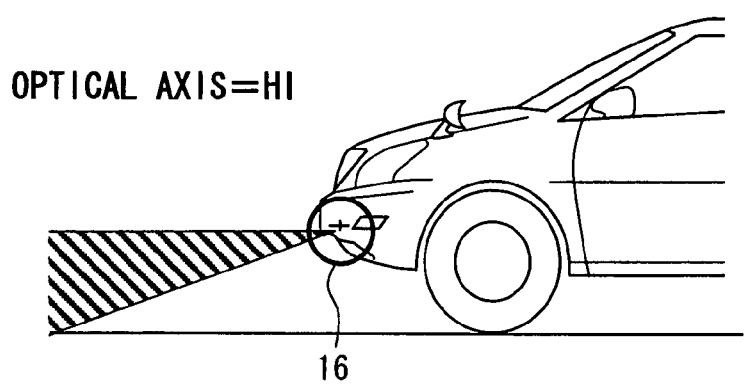
FIG. 4B is a diagram showing the irradiating range when the optical axis of the front fog lamp is raised (Hi) in the first embodiment.

Next, in step S34 the comparator unit 14 determines whether the fog density D exceeds the predetermined threshold Dth1. When the fog density D is determined to exceed the threshold Dth1, the step advances to S35, and when the fog density D does not exceed the threshold Dth1, the process advances to step S38. In step S35, the controller unit 15 causes the front fog lamp 16 to irradiate with a low optical axis angle LOW as shown in FIG. 4A. On the other hand, in step S38, the controller unit 15 causes the front fog lamp 16 to irradiate with a high optical axis angle HI as shown in FIG. 4B, and the process returns to step S30.

Figure 5:
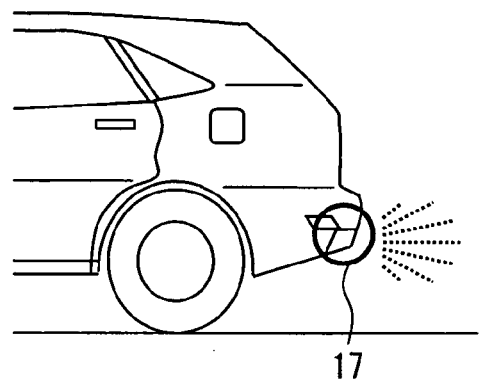
FIG. 5 is a diagram showing flashing of a rear fog lamp in the first embodiment.

Step 36 follows step S 35, and in step S36 the comparator unit 14 determines whether the fog density D exceeds another predetermined threshold Dth2. The threshold Dth2 is greater than the threshold Dth1 in this embodiment (i.e., Dth1<Dth2). When it is determined that the fog density D exceeds the threshold Dth2, the process advances to step S37, and when it is determined that the fog density D does not exceed the threshold Dth2, the process returns to step S30. In step 37, the controller unit 15 causes the rear fog lamp 17 to flash as shown in FIG. 5, and then the process returns to step S30.

Hereafter, an advantage of the lighting control system in the first embodiment will be described. When there is the fog and the fog density D thereof is less than the threshold Dth1, in other words, when the fog is thin, the optical axis angle of the front fog lamp 16 is raised (Hi) as shown in FIG. 4B. If the optical axis angle of the front fog lamp 16 is raised for the thin fog, the irradiation can be made to a long distance. It should be noted that when the fog is thin, the driver of the vehicle is less likely to be distracted by the illumination even if the optical axis angle is raised. In this way, when the fog is thin, the favorable visibility can be obtained if the optical axis angle is raised.

Alternatively, the lighting control system lowers the optical axis angle of the front fog lamp 16 as shown in FIG. 4A, when the fog density D is between Dth1 and Dth2, in other words, when there is thick fog. If the optical axis of the front fog lamp 16 is lowered for the thick fog, the driver of the vehicle is less likely to be distracted by the illumination, and the visibility can be improved in comparison with a case where the optical axis is raised.

On the other hand, when the fog density D is larger than the threshold Dth2, in other words, when the fog is very thick, the lighting control system causes the front fog lamp 16 to irradiate with a low optical axis as shown in FIG. 4A, and causes the rear fog lamp 17 to flash, thereby the front fog lamp 16 is made to irradiate with the low optical axis in the front of the vehicle to obtain the favorable visibility, and the rear fog lamp 17 is made to flash to indicate the presence of the vehicle to drivers of other vehicles.

In such a way, the present lighting control system automatically turns on or off the front fog lamp 16 as an auxiliary lighting and alters the optical axis angle in accordance with the degree of the weather (density of the fog), for performing irradiation in accordance with the degree of the weather condition, thereby improving visibility for the driver.

Also, the present lighting control system flashes or turns off the rear fog lamp 17 in accordance with the degree of the weather, thereby improving visibility for the driver.

Second Embodiment

Figure 6:
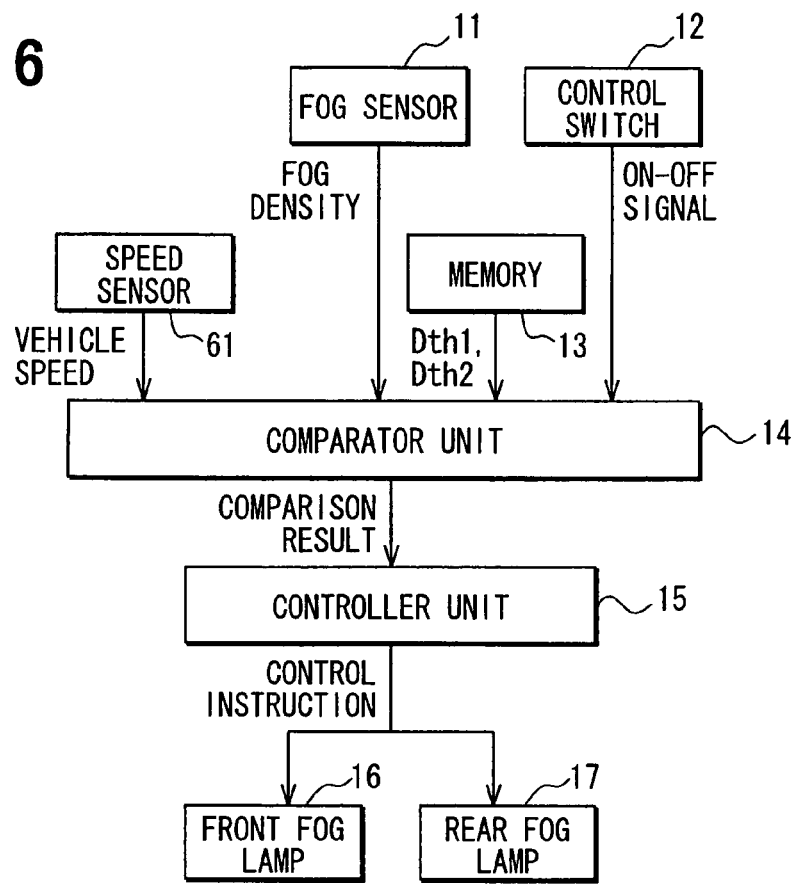
FIG. 6 is a block diagram of the lighting control system in a second embodiment.

A second embodiment will be described by use of FIGS. 6 to 8. A difference in this second embodiment from the first embodiment described above is that the auxiliary lighting is controlled in accordance not only with the weather but also with the speed of the vehicle. Components that are similar to those of the first embodiment are identified with similar reference numerals, and redundant description thereof is omitted.

In the second embodiment, a vehicle speed sensor 61 for detecting a speed of the vehicle is included in the arrangement of the first embodiment shown in FIG. 1. The vehicle speed sensor 61 processes rotational signals of a wheel shaft (not shown) to detect a running speed of the vehicle (hereinafter referred to as "vehicle speed"). The vehicle speed sensor 61 outputs the vehicle speed to the comparator unit 14.

Figure 7:
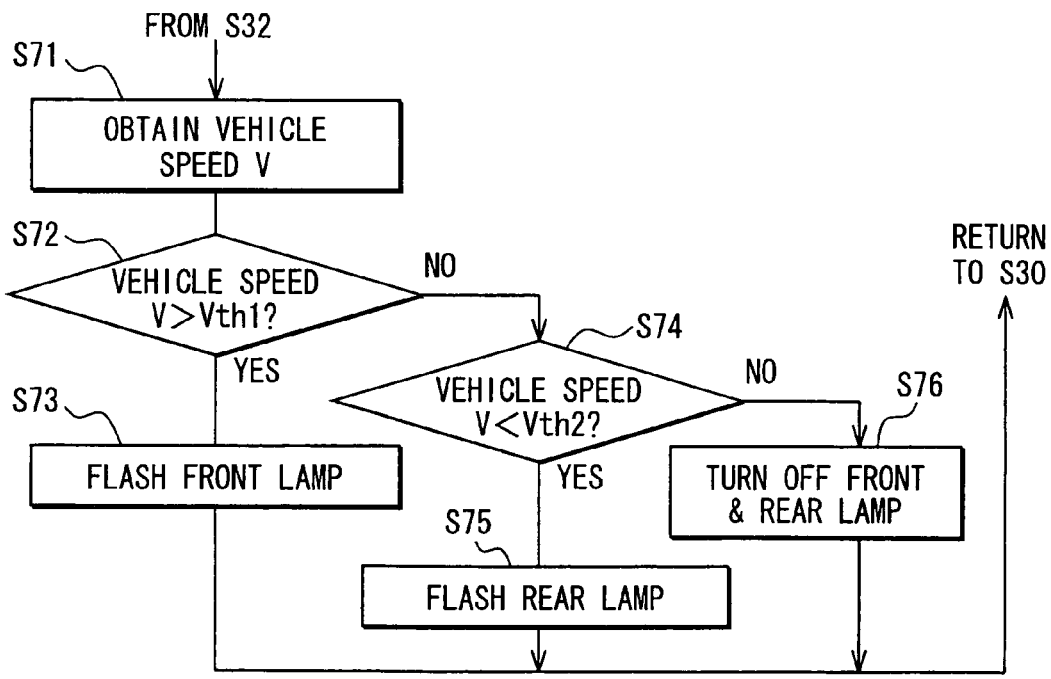
FIG. 7 is a flowchart showing internal processing in the comparator unit and the controller unit in the second embodiment.

By use of a flowchart of FIG. 7, processing performed in the comparator unit 14 and the controller unit 15 is described. The flowchart in FIG. 7 is performed instead of step S39 in FIG. 3. In other words, step S71 is the processing following step S32. In step S71, the vehicle speed V is obtained from the vehicle speed sensor 61. Next, in step S72, the comparator unit 14 determines whether the vehicle speed V exceeds the predetermined threshold Vth1. When it is determined that the vehicle speed V exceeds the threshold Vth1, the step advances to S73, and when it is determined that the vehicle speed V does not exceed the threshold Vth1, the step advances to S74.

In step S73, the controller unit 15 flashes the front fog lamp 16, and the step returns to S30 in FIG. 3.

In step S74, the comparator unit 14 determines whether the vehicle speed V is less than the predetermined threshold Vth2. In this embodiment, the threshold Vth2 is less than the predetermined threshold Vth1 (i.e., Vth1>Vth2). When it is determined that the vehicle speed is less than the threshold Vth2, the process advances to step S75, and if it is determined that the vehicle speed is greater than the threshold Vth2, the process advances to step S76.

In step S75, the controller unit 15 flashes the rear fog lamp 17, and the process returns to step S30 in FIG. 3.

In step S76, the controller unit 15 turns off the front fog lamp 16 and the rear fog lamp 17, and the process returns to step S30.

The lighting control system in the second embodiment achieves the following advantages in addition to the advantages in the first embodiment.

When there is no fog and the vehicle speed exceeds the threshold Vth1, in other words, when the vehicle is running in high speeds, the lighting control system flashes the front fog lamp 16 in order to call attention to the driver of any preceding vehicles, and thereby the driver of the preceding vehicle can be cautioned. It should be noted that when there is no fog, it is less likely that the driver is distracted by the flashing even if the front fog lamp 16 is flashed.

In the meantime, when there is no fog and the vehicle speed does not exceed the threshold Vth2, in other words, when the speed is low, the rear fog lamp 17 is flashed for calling attention to the driver of any following vehicles, and thereby a rear end collision is less likely.

It should be noted that the thresholds Vth1 and Vth2 may not be fixed values. For example, in one embodiment, speed limit information for the current road is obtained by from a navigation system or the like, and in accordance with the speed limit information, the thresholds Vth1 and Vth2 are altered. For instance, in a case of moving a highway with the speed limit of 100 km/hr, abrupt braking by the preceding vehicle and the rear end collision with the following vehicle can be avoided by setting the threshold Vth1 at 100 km/hr and the threshold Vth2 at 60 km/hr.

Figure 8A:
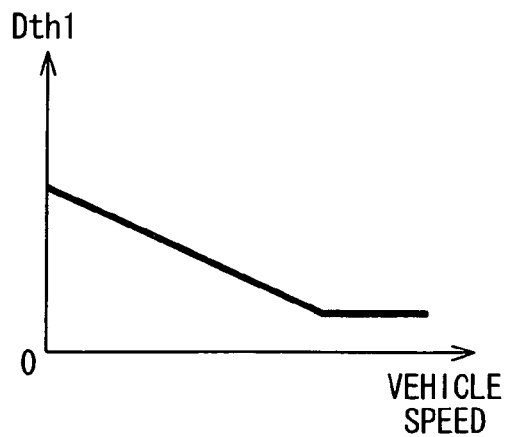
FIGS. 8A and 8B are graphs showing fluctuations of thresholds Dth1 and Dth2 in accordance with the speed of the vehicle in the second embodiment.
Figure 8B:
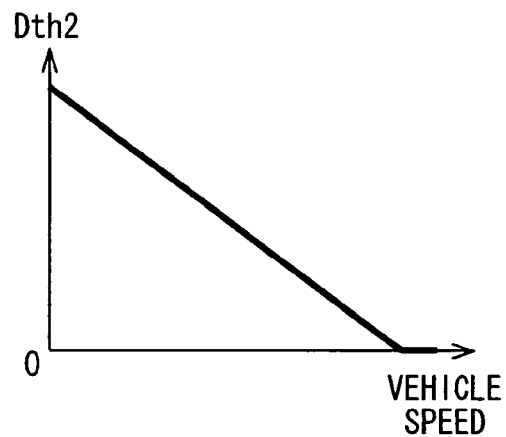

Also, in the embodiment shown in FIG. 8, the thresholds Vth1 and Vth2 are reduced according to the vehicle speed. When the vehicle speed is high, it is desirous to perform support, such as turning-on of the fog lamp and the like even if the fog is thin, in comparison with a case where the vehicle speed is low. Accordingly, more effective support can be made by reducing the respective thresholds in accordance with the vehicle speed.

Third Embodiment

A third embodiment will be described by use of FIGS. 9 to 11. Differences in the third embodiment from the first embodiment described above are that the front fog lamp 16 is a lamp which can alter the irradiating color, that there is a calculator unit 91 instead of the comparator unit, and that the controller unit 15 outputs a control instruction for altering the irradiating color to the front fog lamp 16. Components that are similar to those of the above-described embodiments are indicated with similar reference numerals, and redundant descriptions thereof are omitted.

Figure 9:
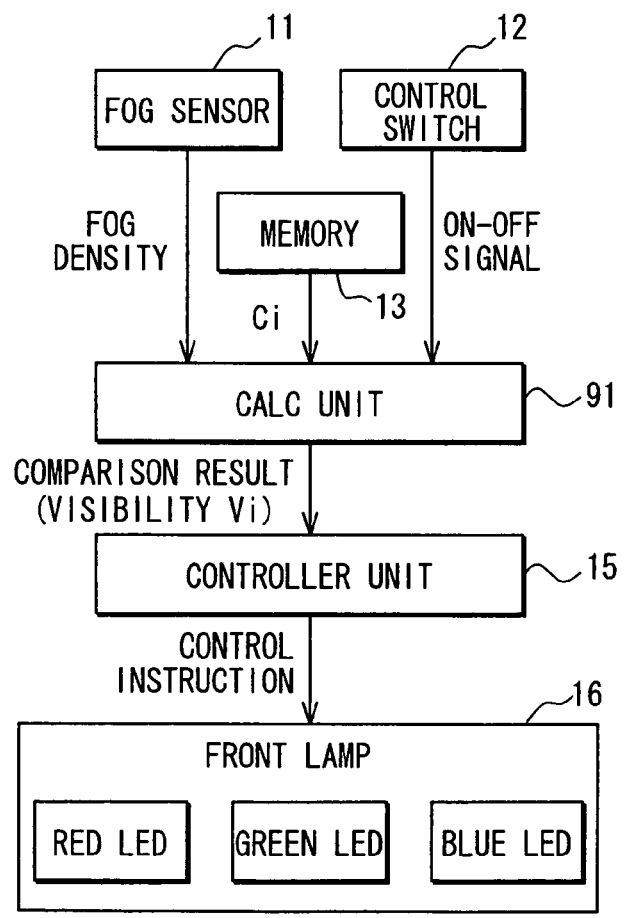
FIG. 9 is a block diagram of lighting control system in a third embodiment.

FIG. 9 shows a block diagram of the lighting control system. As shown in FIG. 9, the front fog lamp 16, the calculator unit 91, the output of the calculator unit 91, and the output of the memory 13 are different from FIG. 1 of the first embodiment.

The front fog lamp 16 is a fog lamp formed by integrating a plurality of LEDs of different colors such as red LEDs, blue LEDs, and green LEDs. The LEDs of different colors may be individually turned on and off. Therefore, for example, when all of the red LEDs and all of the green LEDs are turned on, and half of the blue LEDs are turned on, the front fog lamp 16 can emit the light of yellow irradiating color which has high transmittance for the fog or the like.

Generally, visibility improves when the irradiating light of the lamp has a color closer to the color of the sunlight, and in an environment where there is no scattering substance such as the fog or the like. Therefore, when there is no fog, the front fog lamp 16 turns on all of the red LEDs, all of the green LEDs, and all of the blue LEDs, and is made to irradiate a color which has the largest quantity of light and is closer to the sunlight to the forward of the vehicle. It should be noted that, when all of the LEDs are turned on, the front fog lamp 16 is made to emit the irradiating light which is the closest to the sunlight in the color.

Meanwhile, the calculator unit 91 calculates the transmittance Ti of an irradiating light candidate i according to the fog density D detected by the fog sensor 11. Since the true character of the fog is water particles floating in the air, with the irradiating light having longer wavelength of the irradiating color, the transmittance T of a case where the fog density D is high is higher. In other words, a purple irradiating light having a short wavelength rapidly reduces in transmittance T as the fog density D increases, and the red irradiating light having a long wavelength has less extreme reduction in transmittance T than the purple irradiating light as the fog density D increases.

Further, the calculator unit 91 performs multiplication of the transmittance Ti of respective irradiating light candidates i with the whiteness level Ci (described later) stored in the memory, calculates the visibility Vi as the result of the multiplication, and outputs the visibility Vi to the controller unit 15. In the embodiment shown in the table of FIG. 10, as the candidates for the irradiating light, there are following three kinds, namely, white in which all of the red LEDs, all of the green LEDs, and all of blue LEDs are turned on (R: 100%/G: 100%/B: 100%), thin yellow in which all of the red LEDs, all of the green LEDs, and 50% of the blue LEDs are turned on (R: 100%/G: 100%/B: 50%), and thick yellow in which all of the red LEDs, all of the green LEDs, and 25% of the blue LEDs are turned on (R: 100%/G: 100%/B: 25%).

Figures 10, 11:
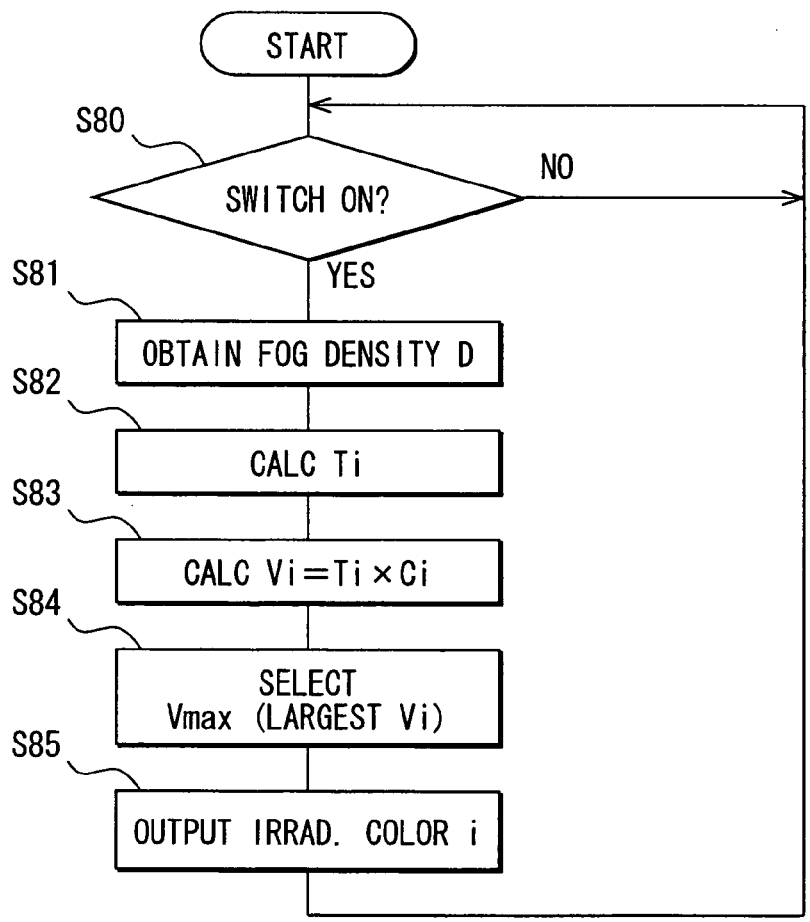
FIG. 10 is a table showing relationship between respective irradiating colors i, and transmittance Ti and visibility Vi for the third embodiment.
FIG. 11 is a flowchart showing internal processing in a calculator unit and controller unit in the third embodiment.

The white level Ci in FIG. 10 means the lighting ratio of respective blue LEDs of the irradiating light candidates i. In other words, the irradiating light as the white (i=1) is expressed by C1=1.0 since all of the blue LEDs are turned on, the irradiating light as the thin yellow (i=2) is expressed by C2=0.5, and the irradiating light as the thick yellow (i=3) is expressed by C3=0.25. As such, the higher the white level Ci, the closer the color of the irradiating light approaches that of sunlight.

Furthermore, the table in FIG. 10 represents an approximate relationship between the respective irradiating colors i and the transmittance Ti and the visibility Vi. The visibility Vi in the table is a multiplied value of the transmittance Ti of a case where the irradiating lights of respective irradiating colors i are irradiated in respective fog density with the approximation ratio to the sunlight of the irradiating color i (white level Ci). Therefore, the visibility Vi schematically represents how the respective irradiating lights which are transmitted and reflected are sensed by the driver of the vehicle. In other words, when there is no fog, the irradiating light of the white color (i=1) is high in the transmittance T1, high in the white level C1, and closer to the sunlight, and thus has a high visibility V1. On the other hand, when there is thin fog, the irradiating light of the white color (i=1) is high in the white level C1, but the transmittance T1 thereof is not high (medium), and therefore the visibility V1 thereof is also not high (medium). Moreover, when there is thick fog, the irradiating light of the white color (i=1) is low in the transmission T1, and most of the light thereof is scattered by the fog to distract the driver of the vehicle, and therefore the visibility V1 thereof is low.

Alternatively, when a irradiating light of the thin yellow color (i=2) is used in a case where there is no fog, the transmittance T2 thereof is high and yet the white level C2 thereof is not high and the irradiating light of the thin yellow color (i=2) has a color different from the sunlight, and therefore the visibility V2 thereof is also not high (intermediate). Alternatively, when there is thin fog, the irradiating light of the thin yellow color (i=2) has the white level C2 which is not high and yet the transmittance T2 thereof is high, and therefore the visibility V2 thereof is also high. Further, when there is thick fog, the irradiating light of the thin yellow color (i=2) has the transmittance T2 which is not high (intermediately), and therefore a part of the light is scattered by the fog obscures the driver's vision, and the white level C2 thereof is also not high, and thus the visibility V2 thereof is also not high (medium).

When an irradiating light of the thick yellow color (i=3) is used in a case where there is no fog, the transmittance T3 thereof is high and yet the white level C3 thereof is low. Thereby the irradiating light of the thick yellow color (i=3) has a color largely different from the sunlight and thus the visibility V3 thereof is low. Alternatively, when there is thin fog, the irradiating light of the thick yellow color (i=3) has high transmittance T3. Therefore it is less likely to be scattered by the fog, yet the white level C3 thereof is low, and the irradiating color thereof is largely different from the sunlight. Therefore the visibility V3 thereof is not high (medium). Further, when there is thick fog, the irradiating light of the thick yellow color (i=3) has high transmittance T3. Thus the light is hard to be scattered by the fog, and therefore the visibility V3 thereof is high.

The controller unit 15 selects the visibility Vmax having the largest numeral, in other words, the most favorable one out of the calculation results of the calculator unit 91 (visibility Vi), and outputs a control instruction to the front fog lamp 16 such that the irradiating color i corresponding to the selected Vmax is irradiated.

Processing in detail will be described by use of a flowchart of FIG. 11. The flowchart in FIG. 11 shows the processing performed in the calculator unit 91 and the controller unit 15.

Firstly, in step S80 it is determined whether the control switch 12 is turned on. If the control switch 12 is determined to have been turned on, the step advances to S81, and if the control switch 12 is not determined to have been turned on, the step repeats S80.

In step S81, the fog density D is obtained from the fog sensor 11. Then in step S82, the transmittances Ti (i=1 to 3) of the cases where the three kinds of the irradiating colors i (i=1 to 3) are respectively irradiated in the environment of the fog density D are respectively calculated. Next in step S83, the respective transmittances Ti and the white level Ci are multiplied to calculate the visibility Vi. Subsequently in step S84, the visibility Vmax having the largest numeral is selected out of the visibility Vi. Then in step S85, a control instruction is outputted to the front fog lamp 16 such that the irradiating light i corresponding to the visibility Vmax is irradiated, and the step returns to S30.

In this manner, the lighting control system numerically represents the visibility for calculation, based on whether or not the transmittance and the irradiating color have a wavelength closer to the sunlight, and the front fog lamp 16 is made to output the irradiating color thereof so as to have the favorable visibility. In other words, more favorable visibility can be obtained by strengthening the yellow color in the irradiating color in accordance with thickening of the fog.

It should be noted that, although, in the third embodiment, the irradiating color i is determined by use of the transmittance Ti and the white level Ci representing the approximation degree to the sunlight, an irradiating color i that simply raises the transmittance Ti may be selected. Further, there may be any suitable number of irradiating color candidates (e.g., at least three candidates).

Other Embodiment

In the embodiments described above, no specific description is made of the quantity of light of the front fog lamp 16 and the rear fog lamp 17. However, a voltage to be applied to the front fog lamp 16 and the rear fog lamp 17 at the time of flashing may be set by adjusting the duty ratio of the PWM control. Also, at the time of flashing, instead of repeating turning-on and turning-off, the quantity of light may be increased or decreased.

Further, the quantity of light may be changed by the constant turning-on and the flashing. For example, if the quantity of light is reduced the driver's vision is less likely to be obscured.

In respective embodiments described above, the weather detecting device is the fog sensor 11 for detecting fog. However, the weather detecting device is not limited thereto. For example, the weather detecting device may be a fog detecting device that uses a camera picture as disclosed in JP-11-278182A (incorporated by reference), or a radar device for detecting snow as disclosed in JP-2000-65932A (incorporated by reference). In the case where the lighting control systems of respective embodiments described above are applied to correspond to the snow, the fog may be replaced with snow in FIG. 3 or FIG. 7. Heavy rain can be detected for similar results. In other words, when the density of an element which scatters the light in the surroundings of the vehicle (water particles) is high, the optical axis may be made to be lowered, and when the density of the element which scatters the light in the surroundings of the vehicle (water particles) is low, the optical axis may be made to be raised.

Figure 12:
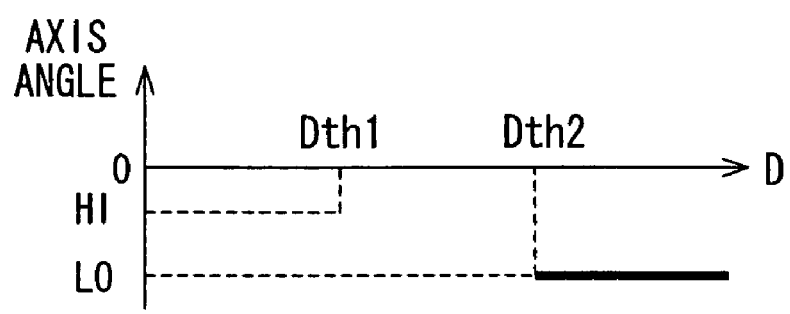
FIG. 12 is a graph showing a relationship between two kinds of optical axis Hi and Lo and the thresholds Dth1 and Dth2 in the lighting control system provided with two kinds of the optical axis of Hi and Lo in another embodiment.
Figure 13:
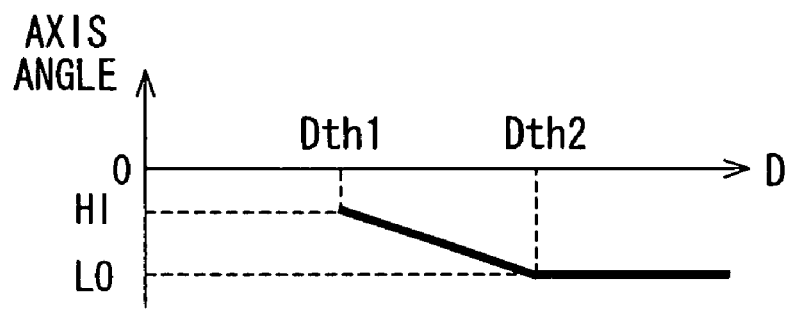
FIG. 13 is a graph showing a relationship between the optical axis and the thresholds Dth1 and Dth2 in the lighting control system provided with non-step optical axis in another embodiment.

In the respective embodiments described above, the front fog lamp 16 is provided with two stepped (high and low) optical axis for determining the optical axis in accordance with two kinds of thresholds (Dth1 and Cth2), as shown in FIG. 12. However, the optical axis of the front fog lamp 16 can include more than two steps or no steps at all. For example, as shown in FIG. 13, when the fog density D is between the thresholds Dth1 and Dth2, the optical axis may be raised or lowered without a step in proportion with the fog density, and when the fog density D is not less than the threshold Dth2, the optical axis may be fixed at a predetermined angle. Furthermore, when a lamp formed by integrating a plurality of LEDs is used instead of a conventional halogen-type lamp, in order to alter from a state where the optical axis is lowered to a state where it is raised, the number of the turned-on LEDs which irradiate the range to which the irradiation is made in the state the optical axis is lowered may be reduced, or the number of the turned-on LEDs which irradiate the range to which the irradiation is made in the state the optical axis is raised may be increased. In other words, instead of totally suspending the irradiation to the irradiating range to which the irradiation is made in the state the optical axis is lowered, the quantity of light to the irradiating range may be reduced, and the quantity of light to the irradiating range to which the irradiation is made in the state the optical axis is raised may be increased. Similarly, in order to alter from the state where the optical axis is raised to the state where the optical axis is lowered, the quantity of light to the irradiating range is reduced and the quantity of light to the irradiating range to which the irradiation is made in the state the optical axis is lowered may be increased, instead of totally suspending the irradiation to the irradiating range to which the irradiation is made in the state the optical axis is raised.

Alternatively, a lamp formed by integrating a large number of LEDs and capable of controlling the irradiating directions of respective LEDs is presumably mounted on a roof, a mirror, or the like, of a vehicle such that the irradiating direction can be set to the front and the rear of the vehicle. If the lamp is like this, when irradiation is not made of the rear direction of the vehicle but is made of the front direction of the vehicle as in step S73 in FIG. 7, the irradiation direction of respective LEDs is set toward the front direction of the vehicle. Further, when irradiation is not made in the front direction of the vehicle but is made in the rear direction of the vehicle as in step S75 in FIG. 7, the irradiating direction of respective LEDs is set in the rear direction of the vehicle. In this manner, the front direction and the rear direction of the vehicle may be irradiated by switching the irradiating direction of one lamp.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A lighting control system for a vehicle comprising:
 a light emitting apparatus including a rear fog lamp provided at a rear part of the vehicle;
 a weather detecting device for detecting a presence of a weather condition surrounding the vehicle and a degree of the weather condition when the presence of the weather condition is detected, the degree of the weather condition being detected in comparison with at least two different first and second predetermined threshold values, the second predetermined threshold value being greater than the first predetermined threshold value and representing a more unfavorable condition than the first predetermined threshold value; and
 a control device for setting an irradiating range of the light emitting apparatus based on the degree of the weather condition, wherein:
 the light emitting apparatus includes a rear fog lamp provided at a rear part of the vehicle;
 the weather detecting device detects a presence of fog as the weather condition and degree of fog density as the degree of the weather condition; and
 when the density of the fog is determined to exceed the second predetermined threshold value, the control device is further configured to cause the rear fog lamp to flash.

2. The lighting control system according to claim 1, wherein the control device is further configured to set an irradiating color of the light emitting apparatus based on the weather condition and the degree of the weather condition.

3. The lighting control system according to claim 2, wherein the control device calculates a transmittance of an irradiating light of the light emitting apparatus based on the weather condition and the degree of the weather condition and sets an irradiating color of the light emitting apparatus based on the calculation result.

4. The lighting control system according to claim 2, wherein the light emitting apparatus includes a plurality of LEDs of different colors and alters the irradiating color by altering the number of illuminated LEDs.

5. The lighting control system according to claim 4, wherein the light emitting apparatus includes a plurality of LEDs of red, green, and blue colors.

6. The lighting control system according to claim 1, wherein the weather detecting device detects visibility from the vehicle to a surrounding area and determines that the degree of the weather condition is favorable when the visibility is more than a predetermined value and that the degree of the weather condition is unfavorable when the visibility is less than the predetermined value.

7. The lighting control system according to claim 6, wherein the control device lowers an optical axis of the light emitting apparatus when the weather detecting device determines that the degree of the weather condition is unfavorable as compared to a case where the weather detecting device determines that the degree of the weather condition is favorable.

8. The lighting control system according to claim 6, wherein the control device raises the optical axis of the light emitting apparatus when the weather detecting device that the degree of the weather condition is favorable as compared to a case where the weather detecting device determines that the degree of the weather condition is unfavorable.

9. The lighting control system according to claim 6, wherein the control device sets an irradiating range of the light emitting apparatus in a rear of the vehicle, when the weather detecting device determines that the degree of the weather condition is favorable and the speed of the vehicle is less than a predetermined value.

10. The lighting control system according to claim 6, wherein the control device sets an irradiating range of the light emitting apparatus in a front of the vehicle, when the weather detecting device determines that the degree of the weather condition is favorable and the speed of the vehicle is greater than a predetermined value.

11. The lighting control system according to claim 1, wherein the weather detecting device detects visibility to the vehicle from a surrounding area and determines that the degree of the weather condition is favorable when the visibility is more than a predetermined value and that the degree of the weather condition is unfavorable when the visibility is less than the predetermined value.

12. The lighting control system according to claim 1, wherein the weather detecting device further detects the transmittance of the irradiating light of the light emitting apparatus in a space in the surroundings of the vehicle; and determines that the degree of the weather condition is favorable when the transmittance is more than a predetermined value and that the degree of the weather condition is unfavorable when the transmittance is less than the predetermined value.

13. The lighting control system according to claim 1, wherein the weather detecting device further detects a density of water particles in the surroundings of the vehicle; and determines that that the degree of the weather condition is favorable when the density is less than a predetermined value and that the degree of the weather condition is unfavorable when the density is more than the predetermined value.

14. The lighting control system according to claim 1, wherein the control device sets the irradiating range of the light emitting apparatus based on the degree of the weather condition and the speed of the vehicle.

15. The lighting control system according to claim 1, wherein the weather detecting device further detects a snowy weather condition and an amount of snowfall is the degree of the weather condition.

16. The lighting control system according to claim 1, wherein the weather detecting device further detects a rainy weather condition and an amount of rainfall is the degree of the weather condition.

17. The lighting control system according to claim 1, wherein:
the light emitting apparatus further includes a front fog lamp provided at a front part of the vehicle; and
the control device is further configured to control such that an optical axis of the front fog lamp when the density of the fog exceeds the first threshold value is lowered as compared to an optical axis of the front fog lamp when the density of the fog does not exceed the first threshold value.

18. A lighting control system for a vehicle comprising:
a rear fog lamp provided at a rear part of the vehicle;
a weather detecting device configured to detect (i) a presence of a fog as a weather condition surrounding the vehicle and (ii) a density of the fog when the presence of the fog is detected, the density of the fog being detected in comparison with at least two different first and second predetermined threshold values, the second predetermined threshold value being greater than the first predetermined threshold value; and
a control device configured to cause the rear fog lamp to be flashing when the density of the fog is determined to exceed the second predetermined threshold value.

* * * * *